United States Patent
Geis-Esser et al.

(10) Patent No.: US 11,441,616 B2
(45) Date of Patent: Sep. 13, 2022

(54) ACTUATING MECHANISM, IN PARTICULAR FOR A CLUTCH ACTUATOR

(71) Applicant: KNORR-BREMSE Systeme fuer Nutzfahrzeuge GmbH, Munich (DE)

(72) Inventors: Daniel Geis-Esser, Munich (DE); Juergen Schudy, Munich (DE); Alexander Koch, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/272,411

(22) PCT Filed: Jul. 29, 2019

(86) PCT No.: PCT/EP2019/070342
§ 371 (c)(1),
(2) Date: Mar. 1, 2021

(87) PCT Pub. No.: WO2020/043409
PCT Pub. Date: Mar. 5, 2020

(65) Prior Publication Data
US 2021/0324919 A1    Oct. 21, 2021

(30) Foreign Application Priority Data
Aug. 31, 2018    (DE) ..................... 10 2018 214 881.3

(51) Int. Cl.
*F16D 23/14*    (2006.01)
*F16D 125/58*    (2012.01)

(52) U.S. Cl.
CPC ...... *F16D 23/143* (2013.01); *F16D 2125/582* (2013.01); *F16D 2125/587* (2013.01)

(58) Field of Classification Search
CPC .. F16D 23/14; F16D 23/143; F16D 2125/582; F16D 2125/587; F16D 2500/102; F16D 13/30; F16B 2/22
See application file for complete search history.

(56) References Cited

U.S. PATENT DOCUMENTS

| | | | |
|---|---|---|---|
| 4,399,898 A | 8/1983 | Olschewski et al. | |
| 4,405,041 A | 9/1983 | Broadbent | |
| 5,984,072 A | 11/1999 | Leimbach et al. | |

FOREIGN PATENT DOCUMENTS

| | | |
|---|---|---|
| CN | 101033776 A | 9/2007 |
| CN | 105202056 A | 12/2015 |

(Continued)

OTHER PUBLICATIONS

International Search Report (PCT/ISA/210) issued in PCT Application No. PCT/EP2019/070342 dated Nov. 12, 2019 with English translation (five (5) pages).

(Continued)

*Primary Examiner* — Ernesto A Suarez
*Assistant Examiner* — Lori Wu
(74) *Attorney, Agent, or Firm* — Crowell & Moring LLP (57) ABSTRACT

An actuating mechanism for a clutch actuator includes: an actuating element which is designed to be acted on by an actuating force and thereby displaced in an actuation direction, a transmitting element which is designed to carry out a displacement in the actuation direction, wherein a tensioning element is provided between the actuating element and the transmitting element. The tensioning element is designed to generate, for the transmission of the actuating force to the transmitting element, a clamping pressure force which generates a friction force for the transmission of the actuating force. The friction force is configured so as to be capable of transmitting a maximum actuating force.

14 Claims, 3 Drawing Sheets

(56) References Cited

FOREIGN PATENT DOCUMENTS

| | | |
|---|---|---|
| DE | 29 44 648 A1 | 5/1981 |
| DE | 31 13 463 A1 | 12/1982 |
| DE | 3414834 A1 | 10/1985 |
| DE | 42 43 849 A1 | 6/1994 |
| JP | 6-257621 A | 9/1994 |
| JP | 10-119603 A | 5/1996 |

OTHER PUBLICATIONS

German-language Written Opinion (PCT/ISA/237) issued in PCT Application No. PCT/EP2019/070342 dated Nov. 12, 2019 (three (3) pages).

German-language Examination Report issued in German Application No. 10 2018 214 881.3 dated Sep. 21, 2018 with partial English translation (10 pages).

International Preliminary Report on Patentability (PCT/IB/326 & PCT/IB/373) issued in PCT Application No. PCT/EP2019/070342 dated Mar. 11, 2021, including English translation of document C2 (German-language Written Opinion (PCT/ISA/237) previously filed on Mar. 1, 2021) (seven (7) pages).

Chinese-language Office Action issued in Chinese Application No. 201980056565.2 dated Mar. 2, 2022 with English translation (12 pages).

Japanese-language Office Action issued in Japanese Application No. 2021-510818 dated May 23, 2022 with English translation (nine (9) pages).

Fig. 1

ACTUATING MECHANISM, IN PARTICULAR FOR A CLUTCH ACTUATOR

BACKGROUND AND SUMMARY OF THE INVENTION

The invention relates to an actuating mechanism for the conversion of an actuating force into a displacement of a transmission element. Furthermore, the invention relates to a clutch actuator which has an actuating mechanism of this type.

Actuating mechanisms convert an actuating force which is applied to an actuating element into a displacement of a transmission element, in order, for example, to disengage a clutch, by the displacement being introduced into the clutch. Other technical apparatuses can also be actuated by means of an actuating mechanism of this type, however.

In the case of actuating mechanisms of this type, there is the problem, in particular, that an overload protection means is required, in order firstly not to convert an excessively high actuating force into a displacement of the transmission element, as a result of which downstream apparatuses, such as, for example, a clutch actuator, might be damaged, and in order secondly not to support a force which is introduced by the downstream apparatus into the actuating mechanism in the latter, with the result that it might be damaged. Moreover, it has to be ensured that a reliable displacement of a transmission element by way of a desired actuating force can nevertheless take place.

Therefore, it is an object of the present invention to provide an actuating mechanism of the above-described type and a clutch actuator, which solve at least one of the abovementioned problems.

This object is achieved by way of the subjects of the independent claims. Advantageous developments are the subject matter of the dependent claims.

According to the invention, an actuating mechanism for clutch actuator is provided, having:

an actuating element which is configured to be loaded with an actuating force and, as a result, to be displaced in an actuating direction, a transmission element which is configured to carry out a displacement in the actuating direction, a tensioning element provided between the actuating element and the transmission element, which tensioning element is configured to generate a tensioning pressing force in order to transmit the actuating force to the transmission element, which tensioning pressing force generates a frictional force for the transmission of the actuating force, and the frictional force being configured in such a way that it is capable of transmitting a maximum actuating force.

As a result, an overload protection means is advantageously configured between the actuating element and the transmission element. Actuating forces can now be converted only up to a maximum force as a displacement of the transmission element. Secondly, it can also be prevented that an excessively high force is introduced into the transmission element by way of a downstream apparatus, which excessively high force might be transmitted to the actuating element.

The actuating mechanism preferably has a compensation mechanism which is configured to apply a reinforcing pressing force between the transmission element and the actuating element when an actuating force is applied to the actuating element, and to reduce the reinforcing pressing force between the transmission element and the actuating element preferably to zero, if no actuating force is applied to the actuating element, the reinforcing pressing force acting in addition to the tensioning pressing force in the form of an overall pressing force, and therefore increasing the maximum actuating force.

Here, the reinforcing pressing force and the tensioning pressing force together form the overall pressing force which preferably acts between a contact face of the transmission element and the contact section of a clamping element. Here, the frictional force is therefore also preferably configured.

The compensation mechanism of the actuating mechanism is preferably configured to generate the reinforcing pressing force between a contact face of the transmission element and a contact section of the clamping element.

A plurality of clamping elements are preferably provided which, further preferably, are arranged in a rotationally symmetrical manner with respect to the actuating direction. Further preferably, the clamping elements can be arranged at identical angular spacings.

The actuating mechanism, in particular the actuating element and the transmission element, are preferably configured such that, if the maximum actuating force is exceeded by way of the actuating force or by way of a force which is introduced into the transmission element, a relative movement starts between the actuating element and the transmission element in the actuating direction. It is therefore ensured that the transmission element and the actuating element can be displaced with respect to one another, without transmitting introduced forces which are excessively high and which might cause damage of the actuating mechanism or apparatuses which are in contact with the actuating mechanism.

The actuating mechanism is preferably configured to decrease the overall pressing force between the transmission element and the actuating element when the actuating element is situated in an end position, the decrease preferably taking place in such a way that, as a result, the maximum actuating force is decreased in such a way that a relative movement between the actuating element and the transmission element in the actuating direction is made possible. As a result, it is advantageously ensured that the transmission element which is configured, for example, for the actuation of an apparatus which is subject to wear, in particular a friction coupling, while no actuating force is being applied to the actuating element, can assume a position in the actuating direction, in order to remain in contact with the apparatus without play even in the case of a worn apparatus. As a result, idle travels which would have to be overcome in the case of the actuation are avoided.

The end position is preferably defined by way of a stop which is configured in a stationary manner with respect to the transmission element and the actuating element.

The clamping element is preferably configured in one piece with the actuating element. This can achieve a situation where the clamping element can be deflected elastically by way of an elastic configuration of the connection between the clamping element and the actuating element.

As an alternative, it is connected to the actuating element via an articulated connection, preferably a torque-free articulated connection. A torque-free articulated connection is configured to transmit merely forces between the clamping element and the actuating element.

The clamping element is preferably configured to deflect the actuating force, which acts on the actuating element, into the reinforcing pressing force. The deflection preferably takes place in such a way that the magnitude of the reinforcing pressing force is proportional to the magnitude of the actuating force.

The deflection is preferably configured to generate a reinforcing pressing force, the magnitude of which exceeds the magnitude of the actuating force.

The clamping element is preferably configured to bear against the stop in the end position of the actuating element. Here, a force which reduces the overall pressing force acts between the stop and the clamping element.

The tensioning element is preferably configured as a spring element which applies the tensioning pressing force between the transmission element and the clamping element. The desired tensioning pressing force can thus be set simply by way of the provision of a defined spring constant. The spring element is preferably of closed configuration, in particular is configured as a ring, the spring element being configured to apply the tensioning pressing force over the full circumference between the transmission element and the actuating element. In this way, a homogeneous configuration of the tensioning pressing force around the transmission element is possible.

The contact face of the transmission element preferably has a coefficient of friction which is increased in comparison with a surface of the transmission element, which surface does not belong to the contact face. As a result, a further increase of the maximum actuating force can be achieved if it has to be ensured that relatively high actuating forces have to be transmitted. Here, the coefficient of friction can preferably be achieved by way of machining of the contact face. Thus, grooves which run, for example, transversely with respect to the actuating direction or a contact face which is generally of rougher design can be expedient.

As an alternative or in addition, the contact section of the clamping element can also be configured in a comparative way, in order to have an increased coefficient of friction.

The contact face preferably has a contour which is configured in such a way that a supporting force of the clamping element on the contact face has a contact angle at different positions along the actuating direction on the contact face, which contact angle is between 70° and 90°, preferably between 80° and 90°, particularly preferably 90° with respect to a tangent of the contact face in this position. An increase of the reinforcing pressing force can thus be achieved, by, in particular at a contact angle of 90° with respect to a tangent on the contact face, the entire supporting force of the clamping element transitioning into the reinforcing pressing force. As a result, an improved support of the supporting force of the clamping element is advantageously achieved, as a result of which a relative movement between the actuating element and the transmission element is prevented or is at least made more difficult.

The actuating mechanism is preferably configured to apply the actuating force pneumatically, hydraulically, mechanically, electrically and/or magnetically to the actuating element. In the case of a pneumatic or hydraulic application of the actuating force, the actuating element is preferably in contact with a piston/cylinder arrangement, or the actuating element is arranged as a piston which closes a pressure space of a cylinder. As a result, the actuating element can be loaded with a pressure force as actuating force. In the case of electric or magnetic application, corresponding elements are provided which generate the actuating force from an electrical magnetic field. This includes, for example, electric motors, in particular linear motors. Otherwise, a mechanical application is also possible, for example by way of a linkage which is in contact with the actuating element.

According to the invention, furthermore, a clutch actuator is provided which has an actuating mechanism, as described above, the clutch actuator being configured to disengage a clutch by way of the transmission element, and the actuating mechanism being configured, if no actuating force acts on the actuating element, to enable the relative movement between the actuating element and the transmission element. This advantageously ensures that the transmission element can compensate for wear of the clutch linings by way of the relative movement, if no actuating force acts on the actuating element. The transmission element can therefore remain permanently in contact with the clutch, in particular with a release bearing of the clutch, with the result that no idle travels can be produced by way of the wear, which idle travels would first of all have to be overcome in the case of an application of an actuating force to the actuating element.

The transmission element is preferably loaded with an elastic prestressing force in the actuating direction, which elastic prestressing force is generated by way of a spring element, the elastic prestressing force being configured in such a way that, when no actuating force is applied to the actuating element, it is in equilibrium with an elastic prestressing force of a clutch spring. This achieves a situation where there is a permanent contact of the transmission element with the clutch, in particular with the release bearing.

The embodiments which have been described up to now can be combined with one another in any desired way, in order to obtain further embodiments which likewise have subjects which correspond to the subjects according to the invention. Therefore, in the following text, the description of preferred embodiments of the invention takes place with reference to the appended drawings.

DETAILED DESCRIPTION OF THE DRAWINGS

Figure 1:
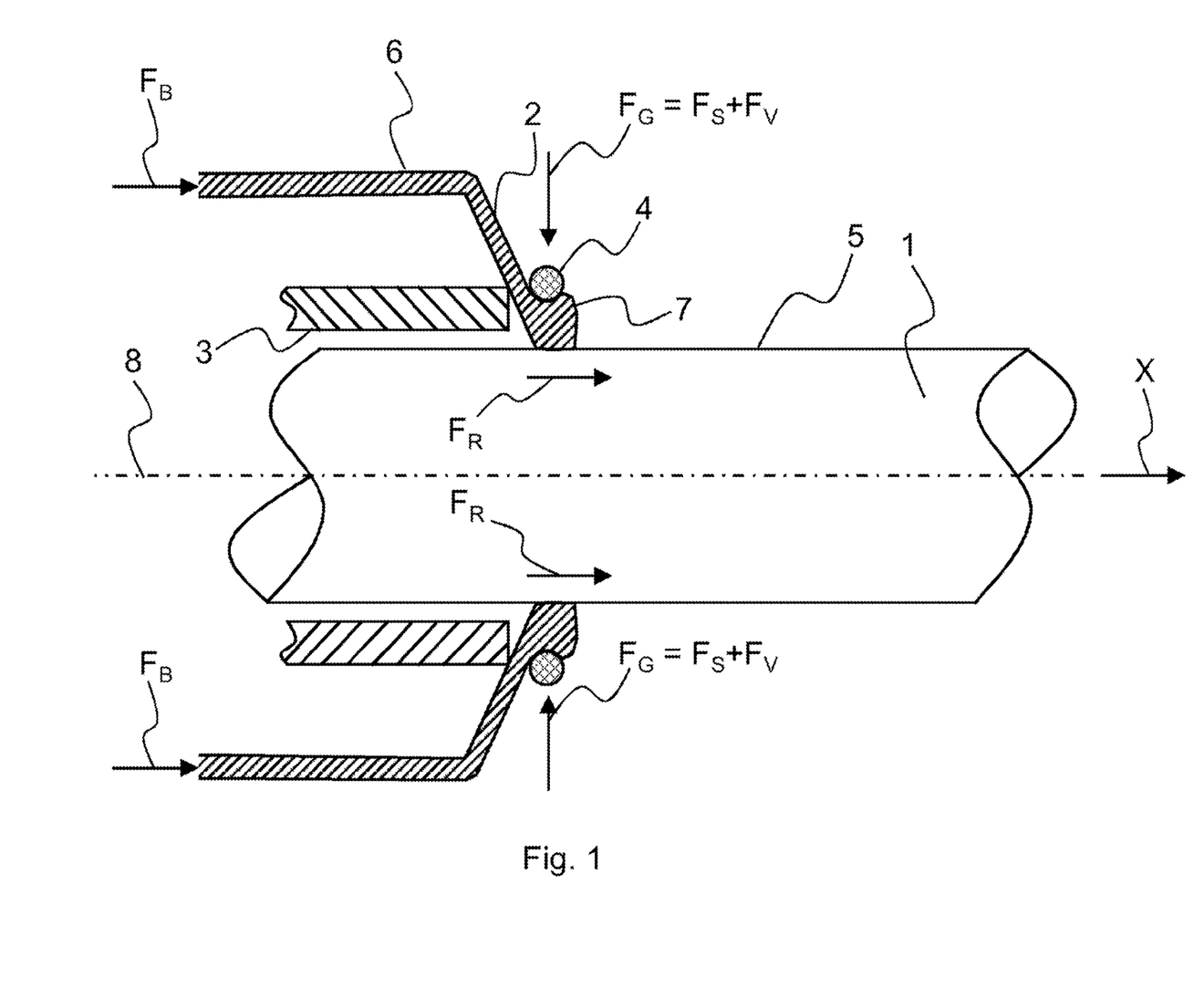
FIG. 1 is an outline sectional view of an actuating mechanism according to an embodiment of the invention.

FIG. 1 shows a sectional view of an actuating mechanism according to the invention. Since the sectional view is symmetrical with respect to a horizontal axis, merely the upper elements of the actuating mechanism are described by way of designations. The lower elements correspond to the upper ones, with the result that designations are not necessary here.

An actuating mechanism is shown which has a transmission element 1 in the form of a cylindrical rod which extends from the left to the right in the illustration which is shown. The transmission element 1 has an axis 8 which is likewise oriented from left to right. Instead of a cylindrical transmission element 1, other cross-sectional shapes are also conceivable. Thus, for example, a square or rectangular cross-sectional shape is also conceivable.

Furthermore, an actuating element 6 is shown in section, which actuating element 6 extends around the transmission element 1 in a rotationally symmetrical manner about the axis 8 of the transmission element 1. Here, the actuating element 6 can be loaded with an actuating force $F_B$ which is shown on the left-hand side of the actuating element 6. On the right-hand side, the actuating element 6 merges into a clamping element 2. Said clamping element 2 is configured in one piece with the actuating element 6 and is oriented so as to bend with respect to it. As an alternative, the clamping element 2 can also be connected to the actuating element 6 via a joint which is provided, for example, in the bend between the actuating element 6 and the clamping element 2. This is a multiple-piece embodiment.

In the embodiment which is shown, further clamping elements 2 are arranged in a rotationally symmetrical manner about the axis 8, and are configured in one piece with the actuating element 6.

The clamping element 2 extends, starting from the actuating element 6, toward the transmission element 1. Here, its free end which is configured here as a contact section 7 makes contact with a contact face 5 of the transmission element 1.

Furthermore, a tensioning element 4 is shown which is arranged on the contact section 7. Here, the contact section 7 is configured correspondingly in order to receive the tensioning element 4. Here, the tensioning element 4 is configured as an annular spring element which extends in a rotationally symmetrical manner about the axis 8 of the transmission element 1. Here, the tensioning element 4 is configured in such a way that it is widened in the illustration which is shown away from the axis 8 by way of the contact section 7. As a consequence, the tensioning element 4 applies a tensioning pressing force $F_S$ from the outside on the contact section 7, as a result of which the latter is pressed onto the contact face 5 of the transmission element 1.

Furthermore, a stop 3 is shown which is configured in a stationary manner with respect to the remaining elements, in particular the actuating element 6 and the transmission element 1. In the illustration which is shown and which corresponds to an end position of the actuating element 6, the clamping element 2 bears against the stop 3. As a result, the clamping element 2 is loaded with a reaction force which leads to the contact section 7 being relieved counter to the tensioning pressing force $F_S$. This takes place by virtue of the fact that the reaction force is oriented parallel to an actuating direction X, a bending moment being produced about the connecting point between the actuating element 6 and the clamping element 2, which bending moment loads the clamping element 2 which is shown at the top in the illustration to the left, and loads the clamping element which is shown at the bottom to the right. This can take place in such a way that a pressing force between the contact section 7 and the contact face 5 is canceled completely.

The method of operation of the actuating mechanism which is shown is as described in the following text.

In the illustration which is shown, the actuating mechanism, in particular the actuating element 6, is situated in an end position. In order then, starting from the actuating force $F_B$, to achieve a displacement of the transmission element 1 in the actuating direction X, the actuating force $F_B$ has to be transmitted to the transmission element 1. The transmission takes place at the contact point between the contact face 5 and the contact section 7. The latter are pressed onto one another by way of the tensioning pressing force $F_S$ of the tensioning element 4. A frictionally locking connection is therefore produced between the contact face 5 and the contact section 7, which frictionally locking connection is capable of transmitting a maximum actuating force. Therefore, the application of the actuating force $F_B$ on the actuating element 6 causes a frictional force $F_R$ between the contact face 5 and the contact section 7, which frictional force $F_R$, if the actuating force $F_B$ is smaller than the maximum actuating force, corresponds to said actuating force $F_B$.

The frictionally locking connection between the contact face 5 and the contact section 7 is therefore configured by way of the tensioning pressing force $F_S$ of the tensioning element 4 to transmit the actuating force $F_B$ to the transmission element 1. As a consequence, the transmission element 1 experiences a displacement in the actuating direction X, which displacement is brought about by the actuating force $F_B$.

Furthermore, the arrangement comprising the actuating element 6, the clamping element 2 and the contact section 7 is configured in such a way that it applies a reinforcing pressing force $F_V$ to the contact face 5 of the transmission element 1 in the case of application of an actuating force $F_B$ to the actuating element 6, the reinforcing pressing force $F_V$ being oriented at least proportionately in an assisting manner with respect to the tensioning pressing force $F_S$, the two forces being summed to form an overall pressing force $F_G$. The reinforcing pressing force $F_V$ is generated as described in the following text.

If an actuating force $F_B$ is applied to the actuating element 6, the clamping element 2 is released from the stop 3 as a result. As a result, the reaction force between the clamping element 2 and the stop 3 is canceled, as a result of which the actuating force $F_B$ then has to be supported by way of the clamping element 2 which is then free standing on the transmission element 1. On account of the angled arrangement of the actuating element 6 and the clamping element 2, a high reaction force is produced as a result between the contact section 7 and the contact face 5. The reaction force is proportional to the applied actuating force $F_B$, and acts in a pressing manner between the contact face 5 and the contact section 7. Therefore, said reaction force is active as a reinforcing pressing force $F_V$ which increases an overall pressing force $F_G$ as a sum of the tensioning pressing force $F_S$ and the reinforcing pressing force $F_V$. As a result of the increase of the overall pressing force $F_G$, the maximum actuating force which can be transmitted between the contact face 5 and the contact section 7 is also increased. Therefore, the generation of the reinforcing pressing force $F_V$ leads to it being possible for the displacement of the transmission element 1 in the actuating direction X to take place reliably. The risk of the transmission element 1 slipping with respect to the contact section 7 is minimized as a result.

Nevertheless, the connection which is shown between the contact face 5 and the contact section 7 has a maximum actuating force, as a result of which an overload protection means is realized which, for example, permits the transmission element 1 to slip with respect to the contact section 7 when an excessively great counterforce is introduced into the transmission element 1 and therefore into the actuating mechanism counter to the actuating direction X.

Moreover, the actuating mechanism which is shown has an automatic wear adjustment means which is active when the actuating element 6 is situated in the illustrated end position and/or when the illustrated clamping element 2 bears against the stop 3. To this end, the actuating element 6 or the clamping element 2 is loaded with a force counter to the actuating direction X, which force comes, for example, from a spring (not shown), with the result that the actuating element 6 and/or the clamping element 2 are/is pressed into the end position, the reaction force between the stop 3 and the clamping element 2 being increased as a result. As described above, the reaction force between the stop 3 and the clamping element 2 brings it about that the overall pressing force $F_G$ is reduced as a result. Here, the involved elements are configured in such a way that the overall pressing force $F_G$ is reduced in such a way that a displacement of the transmission element 1 with respect to the contact section 7 can be achieved even by way of small forces which are introduced from the outside into the transmission element 1 counter to the actuating direction X.

A force of this type can be introduced into the transmission element 1, for example, by way of a clutch spring, the transmission element 1 being configured in this case to come into contact, for example, with a release bearing of the clutch, the coupling force being introduced via the release bearing into the transmission element 1.

If, for example, the clutch linings are greatly worn, the wear has to be compensated for. This takes place by virtue of the fact that the clutch spring presses with greater strength on the transmission element 1. Since, in the illustrated end position, the overall pressing force $F_G$ and therefore the maximum actuating force between the contact face 5 and the contact section 7 are greatly reduced, and can even be reduced to zero in one preferred exemplary embodiment, the transmission element 1 can then move freely with respect to the contact section 7 and can compensate for the clutch wear as a result, as long as no actuating force $F_B$ is applied to the actuating element 6. In the case of the application of an actuating force $F_B$, the overall pressing force $F_G$ and therefore the maximum actuating force between the contact face 5 and the contact section 7 are increased again. This takes place at the latest when the clamping element 2 is released from the stop 3. In preferred embodiments, however, this can already take place at an earlier stage. Accordingly, the connection exists again between the contact face 5 and the contact section 7, as a result of which the clutch can be disengaged by way of the actuating force $F_B$.

Figure 2:
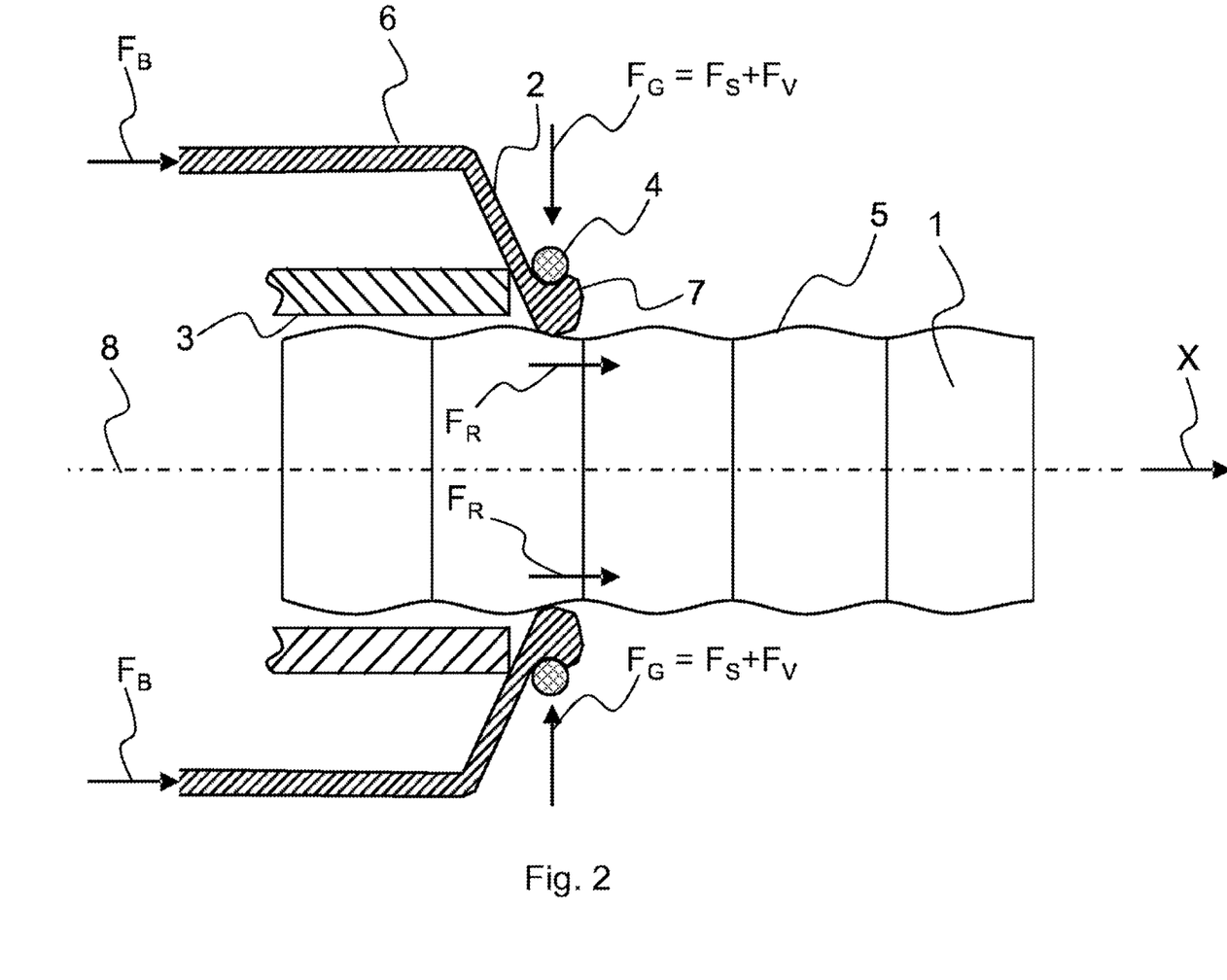
FIG. 2 shows one advantageous development of the actuating mechanism from FIG. 1.

FIG. 2 shows, furthermore, one advantageous development of the actuating mechanism from FIG. 1.

The construction and method of operation of the illustrated mechanism correspond to the actuating mechanism from FIG. 1; therefore, merely the structural differences and their method of operation will be described in the following text.

Here, as in FIG. 1, the transmission element 1 is configured as a rod, and likewise extends from left to right. However, the contact face 5 of the transmission element 1 now has an undulating contour. The latter is configured in a rotationally symmetrical manner about the axis 8 of the transmission element 1, with the result that the contact face 5 has regions with a greater and smaller radius in an alternating manner in the actuating direction X, the transitions between the regions being of steady design and, in particular, not having any edges.

The operating principle of the tensioning element 4 corresponds here to the operating principle of the tensioning element 4 from FIG. 1. The wear compensation in the illustrated end position also corresponds to that as described in FIG. 1.

In comparison with a non-contoured contact face 5, as described in FIG. 1, the contoured contact face 5 has a positive effect on the maximum actuating force which can be transmitted. To this end, reference is made in addition in the further text to FIG. 3 which shows by way of example the effect of the contour at two positions A, B of the contact face 5.

Figure 3:
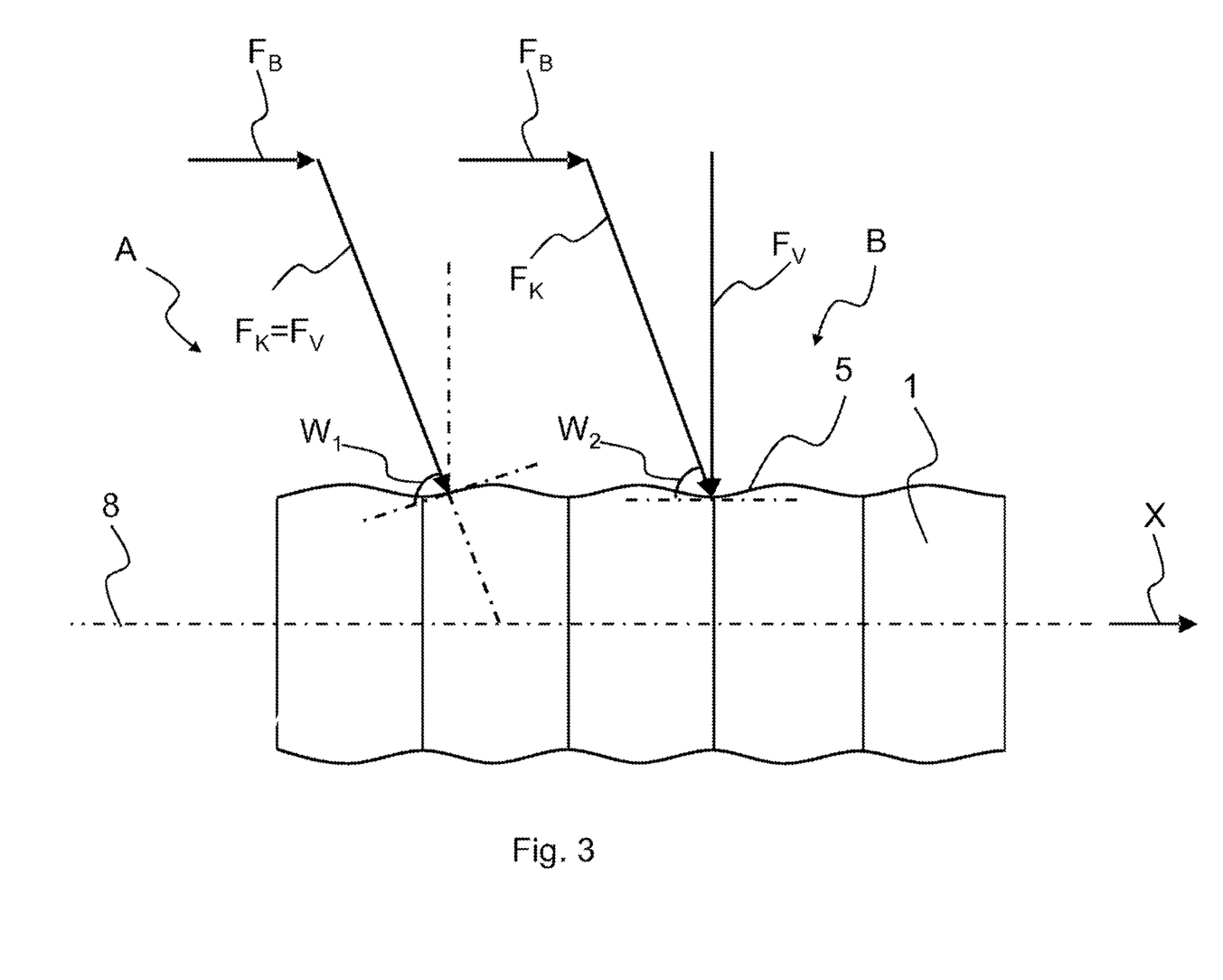
FIG. 3 shows force profiles of the embodiment from FIG. 2.

If the contact section 7 makes contact with a rising (in the actuating direction X) flank of the contour of the contact face 5, as is the case in position A, it is possible in the case of a corresponding configuration of the gradient of the flank that a contact angle $W_1$ is configured to be 90° or at least approximately 90° with respect to a tangent on the contact face 5 in position A, by way of which a supporting force $F_K$ of the clamping element 2 is supported on the contact face 5. Here, the supporting force $F_K$ of the clamping element 2 results from the applied actuating force $F_B$. It is formed by way of the deflection of the actuating force $F_B$.

As a result, the entire supporting force $F_K$ changes into a pressing force of the contact face 5, that is to say, in this case, the reinforcing pressing force $F_V$ is identical to the supporting force $F_K$. In this way, a maximum actuating force is also increased.

Slipping of the transmission element 1 with respect to the contact section 7 counter to the actuating direction X is made more difficult by way of the contact. As a result, a reliable displacement of the transmission element 1 in the actuating direction X is made possible.

In position B, the supporting force $F_K$ is applied to the contact face 5 at a contact angle $W_2$ with respect to a tangent on the contact face 5, which contact angle $W_2$ is less than 90°. The reinforcing pressing force $F_V$ therefore no longer corresponds to the entire supporting force $F_K$. As a result of the arrangement which is shown, the reinforcing pressing force $F_V$ is lower as a result than in position A, as a result of which a displacement of the transmission element 1 in the actuating direction X is possible, but the maximum actuating force is reduced here with respect to the position A on account of the lower pressing force.

The contour of the contact face 5 therefore represents a type of latching means, since it specifies positions A on the contact face 5 which are particularly favorable for a reliable displacement of the transmission element 1 in the actuating direction X.

Here, different contours are conceivable. It is advantageous, for example, that the rising flank of the contour extends over as long a region as possible in the actuating direction X, and is followed subsequently by a falling flank which extends over as short a region as possible in the actuating direction X.

Moreover, further tensioning elements 4 are conceivable which likewise make possible the application of a tensioning pressing force $F_S$. For example, a clamp can also be used instead of a spring element, which clamp allows setting of the tensioning pressing force $F_S$, for example by means of a screw.

The illustrated actuating mechanisms can preferably be used in a clutch actuator, as described above. Here, the principle of the transmission of the actuating force $F_B$ from the actuating element 6 to the transmission element 1 can be applied both for centrally arranged clutch actuators and for decentrally arranged clutch actuators. A centrally arranged clutch actuator is arranged, for example, with respect to a clutch in such a way that the displacement of the transmission element 1 in the actuating direction X takes place in a centrally aligned manner with the release bearing of the clutch. Here, the displacement for disengaging the clutch takes place directly by way of the transmission element 1. In the case of a decentral clutch actuator, the transmission element 1 is not arranged in a centrally aligned manner in the actuating direction X with the release bearing. Here, the displacement for releasing the clutch takes place indirectly, for example by way of a transmitting linkage. Furthermore, in the case of a centrally arranged clutch actuator, a shaft which is connected to one clutch side can be guided through the clutch actuator. For example, the axis of said shaft then corresponds to the axis 8 of the transmission element 1, the transmission element 1 being of hollow configuration, and the shaft penetrating the transmission element 1. These and other designs of clutch actuators do not restrict the subject matter of the invention, however.

LIST OF DESIGNATIONS

1 Transmission element
2 Clamping element
3 Stop
4 Tensioning element
5 Contact face
6 Actuating element
7 Contact section
8 Axis
A Position
B Position
FB Actuating force
FG Overall pressing force
FK Supporting force, clamping element 2
FR Frictional force
FS Tensioning pressing force
FV Reinforcing pressing force
W1 Contact angle
W2 Contact angle
X Actuating direction

What is claimed is:

1. An actuating mechanism for a clutch actuator, comprising:
    an actuating element configured to be loaded with an actuating force and, as a result, to be displaced in an actuating direction;
    a transmission element configured to carry out a displacement in the actuating direction; and
    a tensioning element provided adjacent to the actuating element and the transmission element, which tensioning element is configured as a spring which applies a tensioning pressing force in order to transmit the actuating force to the transmission element, wherein
    the tensioning pressing force generates a frictional force for transmission of the actuating force,
    the tensioning element is configured so that the frictional force is capable of transmitting a maximum actuating force, and
    the spring has a closed configuration as a ring configured to apply the tensioning pressing force over the full circumference between the transmission element and the actuating element.

2. The actuating mechanism as claimed in claim 1, further comprising:
    a compensation mechanism configured to apply a reinforcing pressing force between the transmission element and the actuating element when an actuating force is applied to the actuating element, and to reduce the reinforcing pressing force between the transmission element and the actuating element to zero, if no actuating force is applied to the actuating element, wherein
    the reinforcing pressing force acts in addition to the tensioning pressing force in the form of an overall pressing force, and therefore increases the maximum actuating force.

3. The actuating mechanism as claimed in claim 2, wherein
    the compensation mechanism is configured to generate the reinforcing pressing force between a contact face of the transmission element and a contact section of a clamping element.

4. The actuating mechanism as claimed in claim 3, wherein
    the clamping element is configured in one piece with the actuating element, or is connected to the actuating element via a torque-free articulated connection.

5. The actuating mechanism as claimed in claim 3, wherein
    the clamping element is configured to deflect the actuating force, which acts on the actuating element, into the reinforcing pressing force, and
    the magnitude of the reinforcing pressing force is proportional to the magnitude of the actuating force.

6. The actuating mechanism as claimed in claim 3, wherein
    the contact face of the transmission element and/or the contact section of the clamping element has a coefficient of friction which is increased in comparison with the surface of the transmission element, which surface does not belong to the contact face.

7. The actuating mechanism as claimed in claim 3, wherein
    the contact face has a contour which is configured such that a supporting force of the clamping element on the contact face has a contact angle at different positions along the actuating direction on the contact face, which contact angle:
    is between 70° and 90° with respect to a tangent of the contact face in a first position.

8. The actuating mechanism as claimed in claim 1, wherein
    the actuating element and the transmission element are configured such that, if the maximum actuating force is exceeded by way of the actuating force or by way of a force which is introduced into the transmission element, a relative movement starts between the actuating element and the transmission element in the actuating direction.

9. The actuating mechanism as claimed in claim 1, wherein
    the actuating mechanism is configured to decrease the overall pressing force between the transmission element and the actuating element when the actuating element is situated in an end position, and
    the decrease takes place such that, as a result, the maximum actuating force is decreased so that a relative movement between the actuating element and the transmission element in the actuating direction is made possible.

10. The actuating mechanism as claimed in claim 9, wherein
    the end position is defined by way of a stop which is configured in a stationary manner with respect to the transmission element and the actuating element.

11. The actuating mechanism as claimed in claim 10, wherein
    the clamping element is configured to bear against the stop in the end position of the actuating element, and a force which reduces the overall pressing force acts between the stop and the clamping element.

12. The actuating mechanism as claimed in claim 1, wherein
  the actuating mechanism is configured to apply the actuating force pneumatically, hydraulically, mechanically, electrically, magnetically, or a combination thereof, to the actuating element.

13. A clutch actuator, comprising:
  an actuating mechanism as claimed in claim 1, wherein
  the clutch actuator is configured to disengage a clutch by way of the transmission element, and
  the actuating mechanism is configured, if no actuating force acts on the actuating element, to enable relative movement between the actuating element and the transmission element.

14. The clutch actuator as claimed in claim 13, wherein
  the transmission element is loaded with an elastic prestressing force in the actuating direction, which elastic prestressing force is generated by way of a spring, and
  the elastic prestressing force is configured such that, when no actuating force is applied to the actuating element, it is in equilibrium with an elastic prestressing force of a clutch spring.

\* \* \* \* \*